US012592869B2

(12) United States Patent
Surve

(10) Patent No.: US 12,592,869 B2
(45) Date of Patent: Mar. 31, 2026

(54) CLOUD RESIDUAL RISK ASSESSMENT TOOL

(71) Applicant: Wells Fargo Bank, N.A., San Francisco, CA (US)

(72) Inventor: Tanweer Surve, Coppell, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 262 days.

(21) Appl. No.: 18/187,461

(22) Filed: Mar. 21, 2023

(65) Prior Publication Data

US 2024/0323104 A1    Sep. 26, 2024

(51) Int. Cl.
*H04L 41/0897* (2022.01)
*H04L 41/5009* (2022.01)

(52) U.S. Cl.
CPC ...... *H04L 41/5009* (2013.01); *H04L 41/0897* (2022.05)

(58) Field of Classification Search
CPC ............. H04L 41/5009; H04L 41/0897; H04L 63/1433; G06Q 10/0635; G06F 21/577
See application file for complete search history.

(56) References Cited

U.S. PATENT DOCUMENTS

| | | | |
|---|---|---|---|
| 7,552,480 B1 * | 6/2009 | Voss ...................... | G06F 21/577 |
| | | | 713/150 |
| 7,975,165 B2 | 7/2011 | Shneorson et al. | |
| 9,591,016 B1 | 3/2017 | Palmieri et al. | |
| 10,262,145 B2 | 4/2019 | Hoernecke et al. | |

| | | |
|---|---|---|
| 10,318,740 B2 | 6/2019 | Toledano et al. |
| 10,379,910 B2 | 8/2019 | Balasubramanian et al. |
| 10,673,900 B2 | 6/2020 | Nagaratnam et al. |
| 10,691,796 B1 | 6/2020 | Stolte et al. |
| 10,740,469 B2 | 8/2020 | Zheng et al. |
| 11,088,920 B2 | 8/2021 | Firment et al. |

(Continued)

FOREIGN PATENT DOCUMENTS

| | | |
|---|---|---|
| CN | 103607300 B | 1/2017 |

OTHER PUBLICATIONS

Flores et al., "Cloud-GMR: A Qualitative Framework for Governance and Risk Management of Cloud-hosted Public Services", 2020 XLVI Latin American Computing Conference (CLEI), Oct. 19, 2020, 10 pp.

(Continued)

*Primary Examiner* — Lesa M Kennedy
(74) *Attorney, Agent, or Firm* — Shumaker & Sieffert, P.A.

(57) ABSTRACT

A computing device comprising a memory and one or more processors in communication with the memory and configured to: obtain data defining a first plurality of risks for a current host; determine, a first set of residual risk scores for each risk of the first plurality of risks; aggregate the first set of residual risk scores associated with the current host to form a first aggregate residual risk score; obtain data defining a second plurality of risks of a future host; determine a second set of residual risk scores for each risk of the second plurality of risks; aggregate the second set of residual risk scores associated with the future host to form a second aggregate residual risk score; determine whether the second aggregate residual risk score is less than the first aggregate residual risk score; and migrate assets from the current host to the future host.

20 Claims, 5 Drawing Sheets

(56) References Cited

U.S. PATENT DOCUMENTS

| | | | |
|---|---|---|---|
| 11,093,618 B2 | 8/2021 | Murano et al. | |
| 11,223,552 B1* | 1/2022 | Anderson | G06F 16/285 |
| 11,636,213 B1* | 4/2023 | Elgressy | H04L 63/0263 |
| | | | 726/25 |
| 2010/0332889 A1* | 12/2010 | Shneorson | G06Q 10/06 |
| | | | 718/1 |
| 2017/0063622 A1* | 3/2017 | Yoshida | H04L 41/5019 |
| 2018/0068243 A1* | 3/2018 | Vescio | G06F 21/577 |
| 2019/0235449 A1* | 8/2019 | Slessman | G05B 13/02 |
| 2020/0137097 A1 | 4/2020 | Zimmermann et al. | |
| 2021/0165688 A1* | 6/2021 | Reyes | G06F 11/2023 |

OTHER PUBLICATIONS

Mackita et al., "ERMOCTAVE: A Risk Management Framework for IT Systems Which Adopt Cloud Computing", Future Internet, Sep. 10, 2019, 21 pp.
Rahman et al., "A Risk Management Approach for a Sustainable Cloud Migration", Journal of Risk and Financial Management, Nov. 9, 2017, 19 pp.

\* cited by examiner

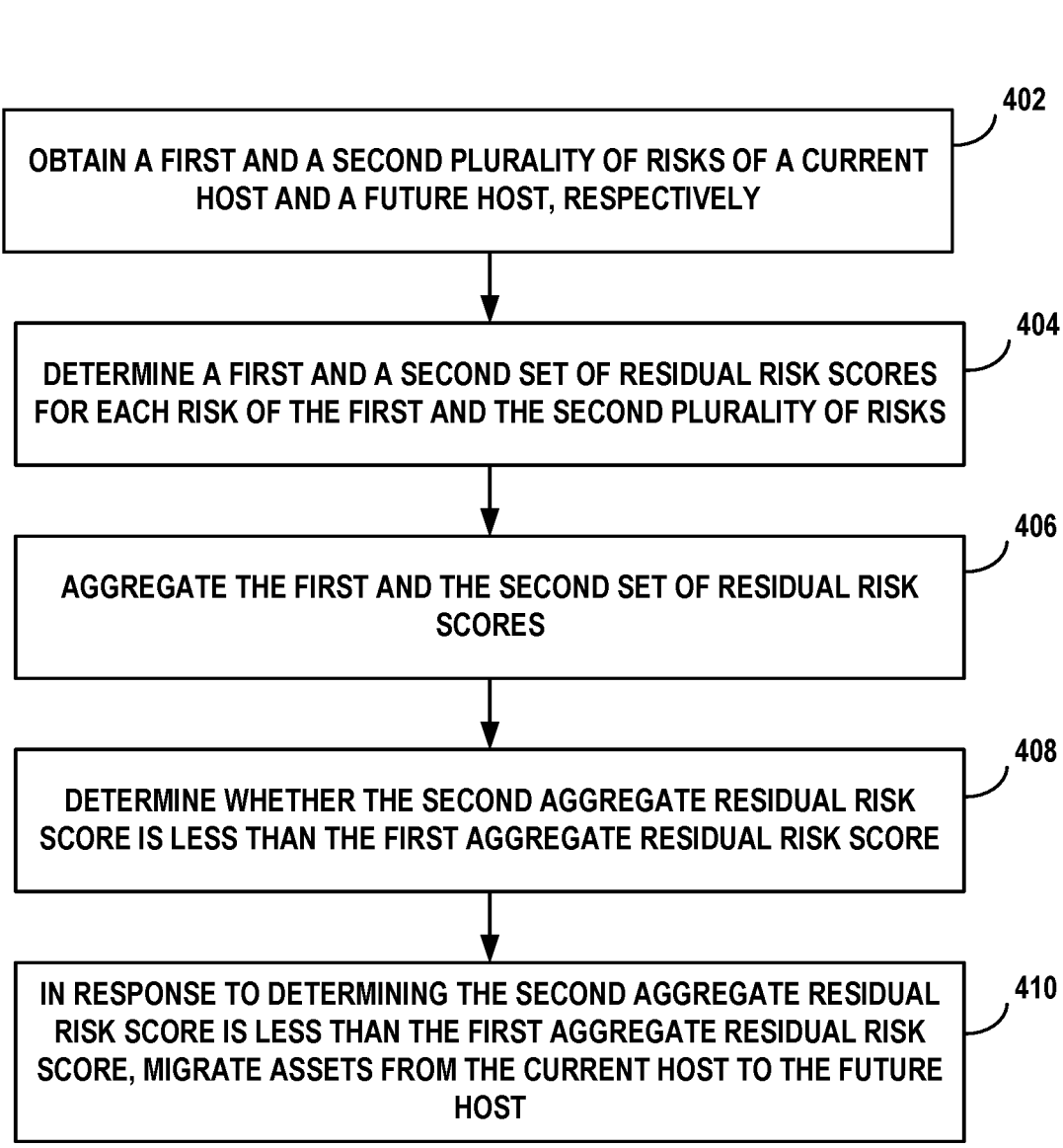

400

402
OBTAIN A FIRST AND A SECOND PLURALITY OF RISKS OF A CURRENT HOST AND A FUTURE HOST, RESPECTIVELY

404
DETERMINE A FIRST AND A SECOND SET OF RESIDUAL RISK SCORES FOR EACH RISK OF THE FIRST AND THE SECOND PLURALITY OF RISKS

406
AGGREGATE THE FIRST AND THE SECOND SET OF RESIDUAL RISK SCORES

408
DETERMINE WHETHER THE SECOND AGGREGATE RESIDUAL RISK SCORE IS LESS THAN THE FIRST AGGREGATE RESIDUAL RISK SCORE

410
IN RESPONSE TO DETERMINING THE SECOND AGGREGATE RESIDUAL RISK SCORE IS LESS THAN THE FIRST AGGREGATE RESIDUAL RISK SCORE, MIGRATE ASSETS FROM THE CURRENT HOST TO THE FUTURE HOST

FIG. 4

CLOUD RESIDUAL RISK ASSESSMENT TOOL

TECHNICAL FIELD

This disclosure relates to computer software applications and systems, in particular, computer systems that support migrating assets to a new hosting environment based on residual risk scores calculated based on quantitative and qualitative risk factors.

BACKGROUND

With the development of host environment technology, such as cloud hosting environments, corporations may consider migrating sensitive assets to a more advanced hosting environment. Corporations may define objectives and requirements of hosting environments and analyze whether a given hosting environment satisfies the objective and requirements. This is a complex process that is done manually through the collaboration of many different personnel across different line of businesses.

SUMMARY

In general, this disclosure describes a computer system configured to analyze residual risks of hosting environments while migrating software-based assets from one host environment to another host environment. Host environments may include hardware, software, management environment, and other computing resources including internal corporate computing systems, third-party cloud services, or other computing systems. Host environments may be used to provide a reliable infrastructure to execute software application or maintain other important software-based assets, such as confidential information stored on one or more computing systems. With the advancement of host environment technology, such as contemporary cloud services, corporations may decide to migrate assets from an internal host environment to a third-party host environment. However, corporations have a need for determining risks of the third-party host environment to guarantee that risks that may be harmful to assets of the current hosting environment are mitigated. The techniques described in this disclosure include an automated way of determining whether a future hosting environment minimizes potential risks to support the migration of assets from the current host to the future host.

In one example, a computing device comprising a memory and one or more processors in communication with the memory and configured to: obtain data defining a first plurality of risks for a current host; determine, a first set of residual risk scores for each risk of the first plurality of risks; aggregate the first set of residual risk scores associated with the current host to form a first aggregate residual risk score; obtain data defining a second plurality of risks of a future host; determine a second set of residual risk scores for each risk of the second plurality of risks; aggregate the second set of residual risk scores associated with the future host to form a second aggregate residual risk score; determine whether the second aggregate residual risk score is less than the first aggregate residual risk score; and migrate assets from the current host to the future host.

In another example, a method comprising: obtaining, by one or more processors, data defining a first plurality of risks for a current host; determining, by the one or more processors, a first set of residual risk scores for each risk of the first plurality of risks; aggregating, by the one or more processors, the first set of residual risk scores associated with the current host to form a first aggregate residual risk score; obtaining, by the one or more processors, data defining a second plurality of risks for a future host; determining, by the one or more processors, a second set of residual risk scores for each risk of the second plurality of risks; aggregating, by the one or more processors, the second set of residual risk scores associated with the future host to form a second aggregate residual risk score; determining, by the one or more processors, whether the second aggregate residual risk score is less than the first aggregate residual risk score; and in response to determining the second aggregate residual risk score is less than the first aggregate residual risk score, migrating, by the one or more processors, assets from the current host to the future host.

In another example, A non-transitory computer readable storage medium storing instructions that, when executed, cause one or more processors of a server device to: obtain data defining a first plurality of risks for a current host; determine, a first set of residual risk scores for each risk of the first plurality of risks; aggregate the first set of residual risk scores associated with the current host to form a first aggregate residual risk score; obtain data defining a second plurality of risks of a future host; determine a second set of residual risk scores for each risk of the second plurality of risks; aggregate the second set of residual risk scores associated with the future host to form a second aggregate residual risk score; determine whether the second aggregate residual risk score is less than the first aggregate residual risk score; and migrate assets from the current host to the future host.

BRIEF DESCRIPTION OF DRAWINGS

FIG. 4 is an example operation 400 in accordance with the techniques described in this disclosure.

DETAILED DESCRIPTION

Figure 1:
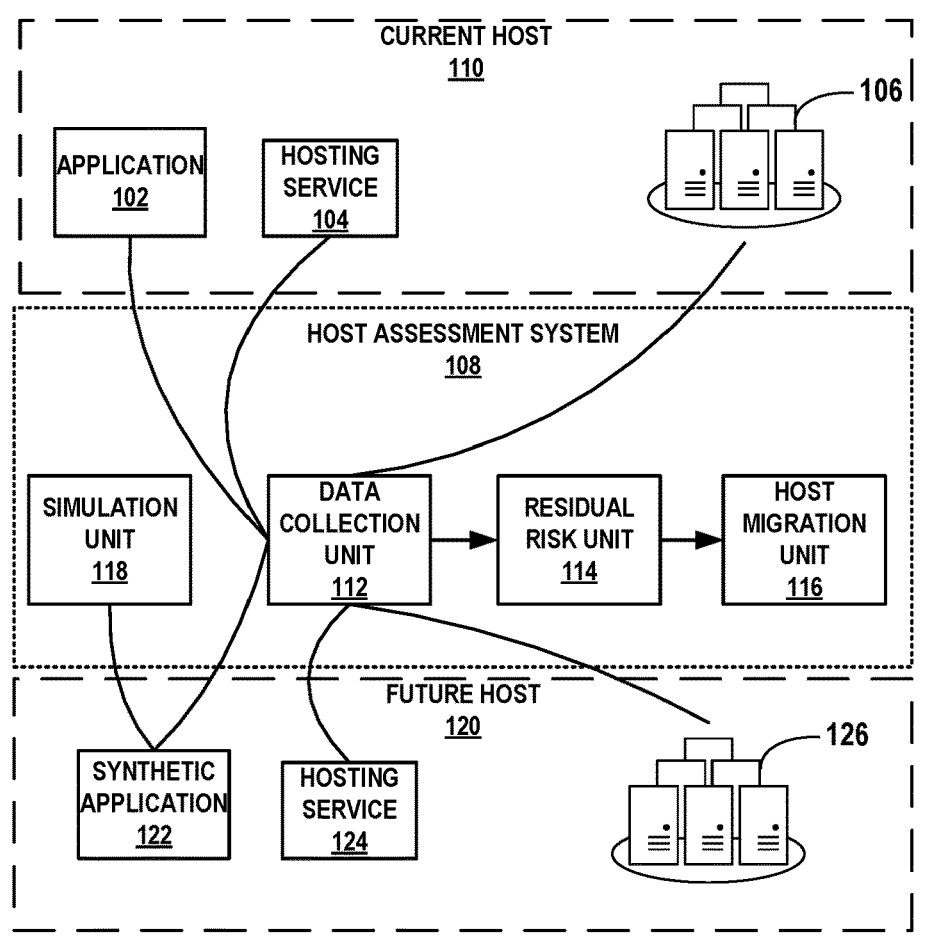
FIG. 1 is a block diagram of an example system illustrating techniques described herein.

FIG. 1 is a block diagram of an example system illustrating techniques described herein. Example system 100 includes current host 110, host assessment system 108, and future host 120. Host assessment system 108 may include data collection unit 112. Data collection unit 112 may collect risk factors from an application domain, hosting service domain, and data center domain of current host 110 and future host 120. Host assessment system 108 may also include simulation unit 118. Simulation unit 118 may send synthetic data to future host 120 to generate synthetic application 122 for data collection unit 112 to obtain risk factors associated with the application domain of future host 120. Host assessment system 108 may also include residual risk unit 114 to calculate aggregated residual risk scores of current host 110 and future host 120. Residual risk is the exposure that remains after risk management or control activities are accounted for. Host assessment system 108 may also include host migration unit 116. Host migration unit 116 may analyze the aggregated residual risk scores of current host 110 and future host 120 to determine whether host migration unit 116 should migrate assets from current host 110 to future host 120.

In accordance with techniques of this disclosure, host assessment system 108 may determine aggregated residual risk scores for each of current host 110 and future host 120 and decide whether future host 120 presents less residual risk than current host 110 to support a migration to future host 120. Host assessment system 108 may contain data collection unit 112, residual risk unit 114, host migration unit 116, and simulation unit 118.

Host assessment system 108 may assess a host (e.g., current host 110 or future host 120) to measure residual risks of the host based on one or more quantitative and qualitative risk factors. Data collection unit 112 of host assessment system 108 may obtain a plurality of records (e.g., system of records) containing data indicating risks associated with one or more risk factors of a particular domain. Data collection unit 112 may obtain the records by initiating one or more software tools (e.g., Remedy, ServiceNow, RSA Archer, Technology & Cybersecurity Policy Exception tool, JIRA, Confluence, Metrics for Data Repositories, Cloud Control Framework, Cloud Security Alliance (CSA) Framework, COBIT Framework, NIST/FedRAMP, Cybersecurity Tools, etc.) that gather data identifying risks associated with one or more quantitative and qualitative risk factors. Data collection unit 112 may obtain the records from a plurality of domains, such as application 102 executing in current host 110, hosting service 104 executing in current host 110, data center 106 executing in current host 110, synthetic application 118 generated by simulation unit 118 and deployed in future host 120, hosting service 124 executing in future host 120, and data center 126 executing in future host 120. In some implementations, data collection unit 112 may obtain risk data from future host 120 with synthetic data simulation unit 118 generates and sends to future host 120 (e.g., simulation unit 118 generating synthetic application which is then probed by data collection unit 112 to collect records containing risks associated with synthetic application 122 executing in future host 120). Data collection unit 112 may organize the records in a map or table that correlates the domain of a particular host with the risks obtained from data collection unit 112. The structure of the data indicating a risk obtained by data collection unit 112 depends on the risk factor associated with the risk.

Quantitative and qualitative risk factors may be applied across one or more domains of a hosting environment based on a hosting strategy a corporation requires. The application domain may include risk factors that assess risks associated with migrating one or more applications or software programs. The hosting service domain may include risk factors that assess risks associated with the capability, security, etc. of services implemented to host the corporation's applications and assets. The data center domain may include risk factors that assess risks associated with the resiliency, capability, security, etc. of servers used to host a corporation's applications and assets.

In some examples, quantitative risk factors of an application domain (e.g., application 102 or synthetic application 122) may include the hosting environment (e.g., the physical and virtual environments encompassing the software, applications, and systems as a whole), open issues or corrective actions for an application, Data sensitivity levels & rating, policy exceptions (e.g., pre-approved suspension of one or more policy requirements), Technology & Security control applicability (e.g., Cloud Control Framework), application health score, application dependencies risk, migration strategy (e.g., evaluating assets to determine the best way to migrate or modernize each asset), and an organization (e.g., measuring effectiveness of an organization's personnel and infrastructure). Quantitative risk factors of a hosting service domain (e.g., hosting service 104 or hosting service 124) may include open issues or corrective actions of the hosting service, policy exceptions, Technology & Security control applicability, enterprise data center services (e.g., metrics of a data center service's availability, space, or power), supplier or vendor management, control design, information security risk assessment (e.g., risks to operations and asset from potential unauthorized access, use, disclosure, disruption, modification of information and/or information systems), continuous monitoring metrics, and an organization. Quantitative risk factors of a data center domain (e.g., data center 106 or data center 126) may include the hosting environment, open issues or corrective actions, policy exceptions, Technology & Security control applicability, enterprise data center services, supplier or vendor management, and organization.

In some examples, qualitative risk factors may be applied across the application domain, the hosting service domain, or the data center domain and may include risk factors that assess an asset migration strategy implemented by an information technology (IT) specialist or the organization and people within the organization holding the assets. Specific qualitative risk factors for assessing the asset migration strategy may include how the domain under analysis manages assets or the domain's qualitative compliance with legal and industry standards (e.g., SOC2). Specific qualitative risk factors for assessing an organization and people associated with the domain under analysis may include the maturity of the organization, the culture or vision of the corporation, the skills or talent of the organization's personnel, the organization's accountability, training or upskilling undertaken by the organization, the organization's communication of strategy, or other performance measurements of the quality of a hosting environment provided by the organization. Data collection unit 112 may obtain data defining qualitative risks factors based one or more scores based on metrics established by an IT specialist or other corporate managers.

Residual risk unit 114 may also aggregate all the residual risk scores assigned to each risk obtained from a particular host (e.g., current host 110 or future host 120). In some implementations, residual risk unit 114 may aggregate the residual risk scores by taking the average of risk scores assigned to each risk. In other implementations, residual risk unit 114 may aggregate the residual risk scores by taking the sum of risk scores assigned to each risk. Residual risk unit 114 may aggregate both the set of residual risk scores assigned to each risk obtained from current host 110 and the set of residual risk scores assigned to each risk obtained from future host 120. Residual risk unit 114 may then send the aggregated residual risk score of current host 110 and future host 120 to host migration unit 116. Host migration unit 116 may compare the aggregated residual risk scores of current host 110 and future host 120 to determine whether the aggregated residual risk score of future host 120 is less than the aggregated residual risk score of current host 110. In response to host migration unit 116 determining that the aggregated residual risk score of future host 120 is greater than the aggregated residual risk score of current host 110, host migration unit 116 may issue an alert to an administrator that future host 120 poses more risk than current host 110 and recommend that future host 120 not be used. In response to host migration unit 116 determining that the aggregated residual risk score of future host 120 is less than the aggregated residual risk score of current host 110, host migration unit may migrate assets from current host 110 to future host 120.

The techniques described herein provide an automated way to determine whether to migrate assets from a current host to a future host. Typically, comparing residual risks of hosts is done manually and become unwieldy for personnel of a corporation to handle. By automatically comparing residual risk scores of a current host and future host to support a migration of assets from the current host to the future host, corporations may be confident in the determination that the future host poses less risk than the current host. The techniques described herein is a scalable solution that allows personnel of the corporation to easily determine whether a future host reduces risk of hosting valuable assets after all the controls of the hosting environment are considered and addressed.

Figure 2:
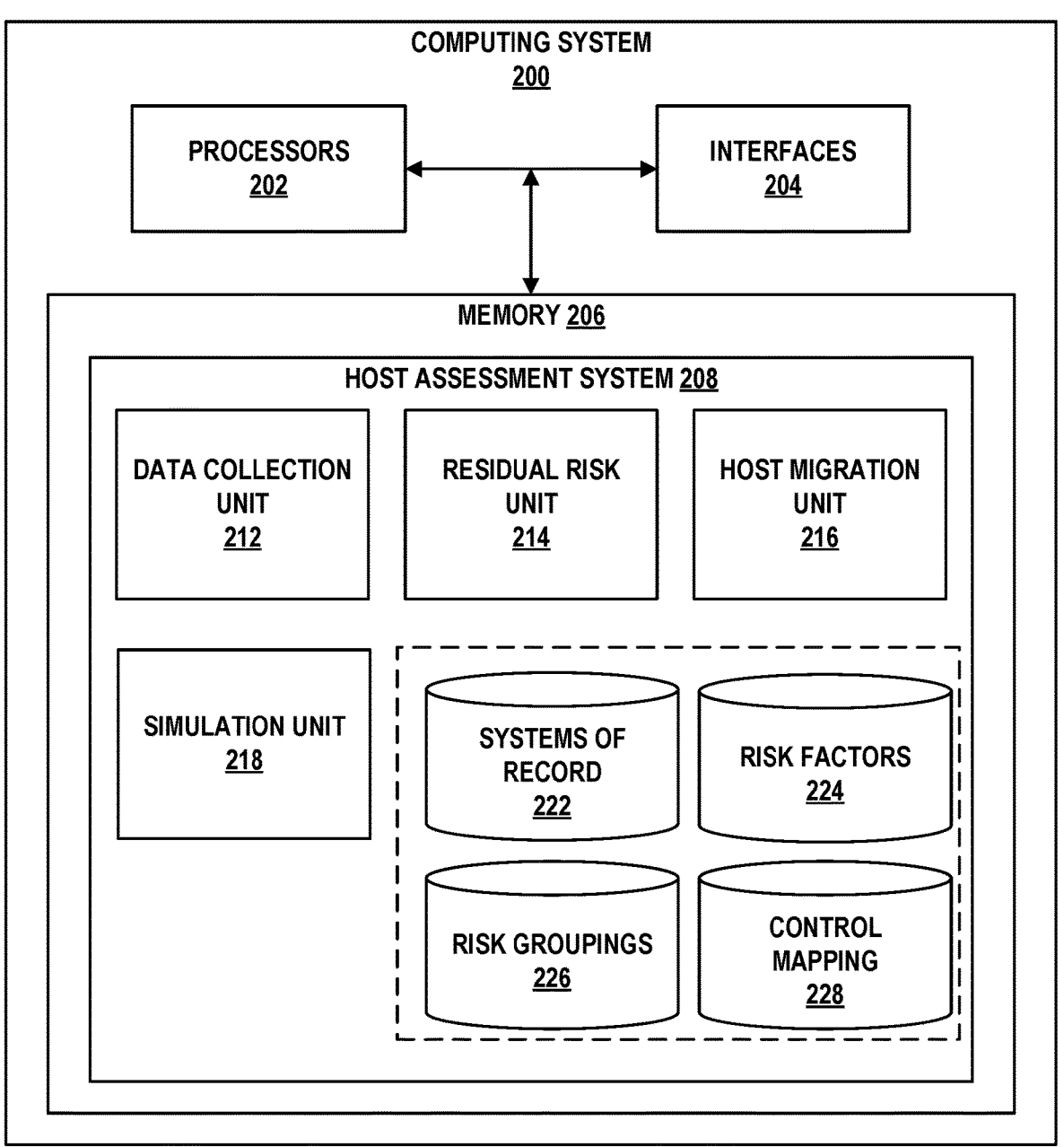
FIG. 2 is an example computing system 200 used to assess and compare residual risks of one or more hosting environments.

FIG. 2 is an example computing system 200 used to assess and compare residual risks of one or more hosting environments. Computing system 200 may include processors 202, interfaces 204, and memory 206 all coupled together. Memory 206 may include host assessment system 208. Host assessment system 208 may include data collection unit 212, residual risk unit 214, host migration unit 216, and simulation unit 218. Host assessment system 208 may also store data in systems of record 222, risk factors 224, risk groupings 226, and control mapping 228.

Data collection unit 212 of host assessment system 208 may use one or more software tools to obtain data representing risks from each domain of a current host or future host and store the data in systems of record 222. In some instances, when host assessment system 208 is analyzing the application domain of a future host, there is no application or software executing on the future host to analyze. Host assessment system 208 may use simulation unit 218 to generate a synthetic application (e.g., synthetic application 122 of FIG. 1) to send to the future host and monitor how the future host processes the synthetic application. The synthetic application may embody characteristics of applications executing on the current host. Data collection unit 212 may simulate disaster recovery (DR) scenarios, conduct penetration tests, etc. to monitor the future host's ability to securely store and manage the synthetic application. In response to data collection unit 212 monitoring the future host processing the synthetic application, data collection unit 212 may use one or more software tools discussed above to obtain data representing risks in the application domain of the future host based on the monitoring.

In some implementations, residual risk unit 214 of host assessment system 208 may calculate residual risk of a current host (e.g., current host 110 of FIG. 1) and a future host (e.g., future host 120) to determine whether host migration unit 216 should migrate assets from the current host to the future host. Residual risk unit 214 may assign a residual risk score to the risks obtained by data collection unit 212 and stored in systems of record 222. Residual risk unit 214 may assign each risk a residual risk score based on risk groupings of the quantitative and qualitative risk factors described above. Host assessment system 208 may establish and store the quantitative and qualitative risks in risk factors 214. Risk groupings 226 may store the mapping of a plurality groups to a particular risk factor, where each group includes a residual risk score associated with a range of potential values of risks associated with a particular risk factor. Residual risk unit 214 or a corporation's IT specialist (via interfaces 204) may establish groups with a numerical residual risk score value based on potential values of risks associated with a particular risk factor. For example, when host assessment system 208 is determining the residual risk score of the application domain, residual risk unit 214 may group risks associated with the risk factor of Application Health Score based on the four potential values of a risk associated with Application Health Score (low, medium, high, or critical). Residual risk unit 214 may establish groups for each of these potential values that includes a residual risk score associated with the level of risk presented by each potential value (e.g., low=1, medium=2, high=3, critical=4). In another example, residual risk unit 214 establish groups with a corresponding residual risk score for risks associated with the risk factor of Application Dependency Risk based on the number of parent/child relationships and assign each group (e.g., 0 parent/child=0, 1 parent/child=1, >1 and ≤5 parent/child=2, and >5 parent/child=3). Residual risk unit 214 may determine a set of residual risk scores that may include the residual risk scores of each group assigned to each risk obtained from the application domain, hosting service domain, and data center domain. Residual risk unit 214 may aggregate the set of residual risk scores to generate an aggregated residual risk score for a particular hosting environment.

Host assessment system 208 may determine an aggregated residual risk score of a current host and future host and compare the aggregated residual risk scores to determine whether assets from the current host should migrate to the future host. Host assessment system 208 may determine the aggregated residual risk scores of the current host and future host as a baseline test and output the aggregated residual risk scores via interface 204 to inform a corporation of any gaps in a corporation's control framework and provide the corporation an opportunity to address the gaps and/or improve the control framework. Control mapping 228 may store the control framework (e.g., cloud controls matrix) that maps control objectives (security, compliance, etc.) to the software domain, hosting service domain, and data center domain. Host assessment system 208 may automatically determine an aggregated residual risk score of a hosting environment in response to updating control objectives stored in control mapping 228 or addressing deficiencies in how the hosting environment addresses the control objectives stored in control mapping 228.

Host assessment system 208 may complete the baseline testing of the current host and future host after a user, via interface 204, indicates that all the control objectives stored in control mapping 228 have been met. In response to host assessment system 208 completing the baseline testing, residual risk unit 214 of host assessment system 208 may determine the aggregated risk scores of the current host and future host and compare whether the aggregated risk score of the future host is less than the aggregated risk score of the current host. In response to residual risk unit 214 determining the aggregated risk score of the future host is greater than the aggregated residual risk score of the current host, residual risk unit 214 may output a warning to a user via interface 204 that migrating assets to the future host is not recommended. In response to residual risk unit 214 determining the aggregated risk score of the future host is less than the aggregated residual risk score of the current host, residual risk unit may instruct host migration unit 216 to automatically migrate assets from the current host to the future host. In some instances, residual risk unit may output a request via interface 204 to get a user's approval before host migration unit 216 automatically migrates assets from the current host to the future host.

Figure 3:
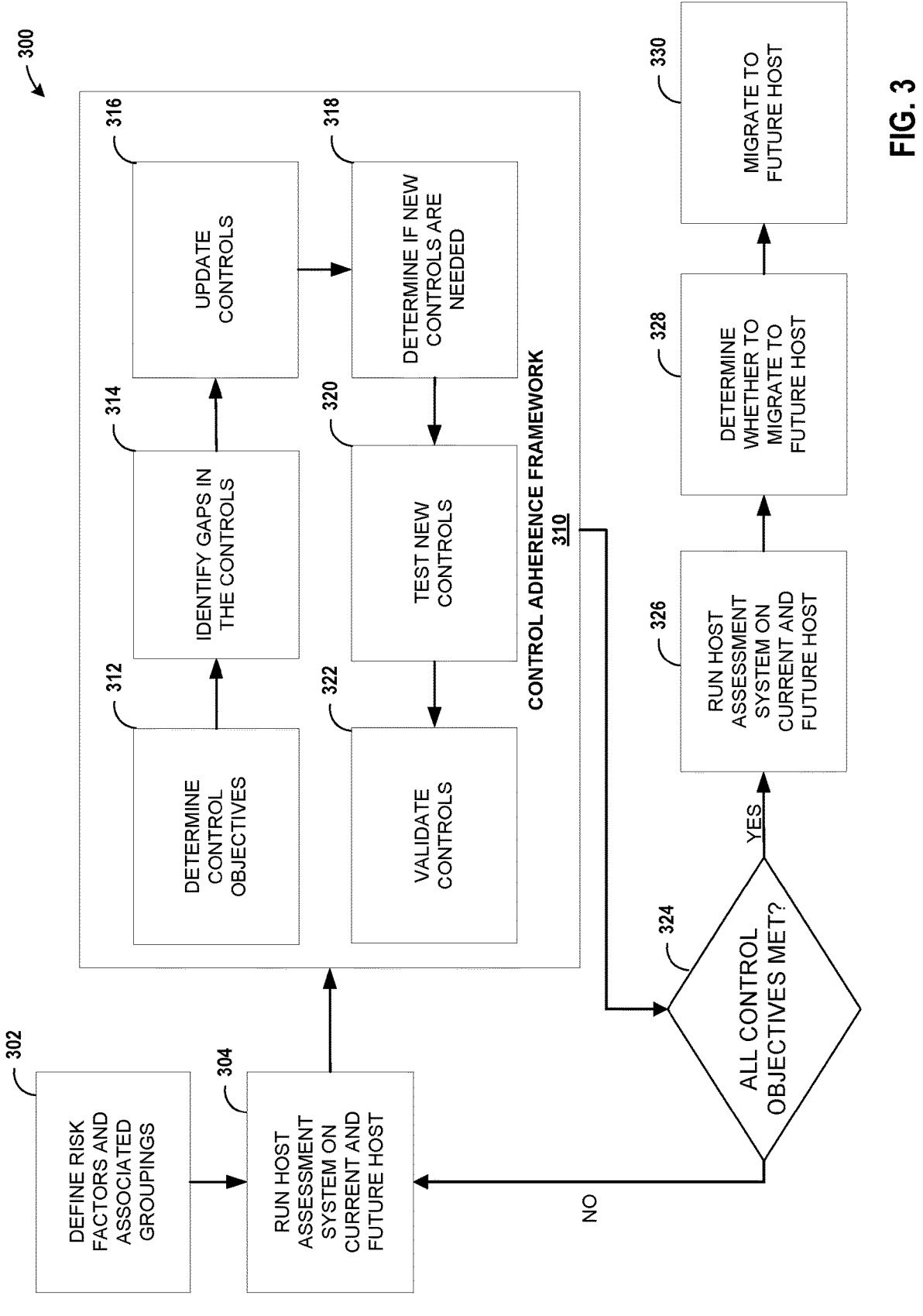
FIG. 3 is a flowchart illustrating an example operation 300 in accordance with techniques described herein.

FIG. 3 is a flowchart illustrating an example operation 300 in accordance with techniques described herein. In step 302, a corporation may define risk factors and associated groupings as discussed above. In step 304, a host assessment system may incorporate the risk factors and groupings defined in step 302 to determine an aggregated risk score in accordance with the techniques previously described. The host assessment system may output the residual risk scores and the groups assigned to each risk obtained by the host assessment system. A user may use the information regarding the residual risk score of a hosting environment to address gaps in control objectives and improve control objective applied by the hosting environment. The user may use address a hosting environment's compliance with control objectives in any manner well-known in the art. For example, control adherence framework 310 may include steps the user may use to address gaps in control objectives and improve a hosting environment's compliance with the control objectives.

In the example of FIG. 3, control adherence framework 310 provides steps a corporation may take to mitigate the aggregated residual risk score of a hosting environment and guarantee that the hosting environment complies with all the control objectives of a control framework. In step 312, a corporation may determine the control objectives according to a control framework implemented by the corporation. In step 314, the corporation may identify gaps in the controls of an analyzed hosting environment based on the aggregated residual risk score calculated by the host assessment system. In step 316, the corporation may update the scope of existing controls address the gaps identified in step 314 or in response to input from personnel of the corporation. In step 318, the corporation may determine if new controls are needed to mitigate any potential residual risks and lower the aggregated residual risk score of the analyzed hosting environment. In step 320, the corporation may perform testing of new controls to determine the effectiveness of the design of the new controls. In step 322, the corporation may validate the controls by ensuring that the analyzed hosting environment is capable of adhering to the updated or newly added control objectives. In response to the corporation updating or adding to the controls according to control adherence framework 310, the corporation may determine whether the analyzed hosting environment has met all the control objectives (324). If the analyzed hosting environment is determined to not have met all the control objectives, the host assessment system may be used to analyze the hosting environment again so the corporation may make adjustments according to control adherence framework 310. The host assessment system may iteratively determine an aggregated residual risk score of an analyzed hosting environment (304) and the corporation may iteratively determine adherence with the controls (312-322) until it is determined that the analyzed hosting environment has met all control objectives.

In response to determining that the analyzed hosting environment has met all the control objectives, the host assessment system may determine the aggregated residual risk score of the analyzed hosting environments (326). The host assessment system may determine whether to migrate assets from a current host to a future host if the aggregated residual risk score of the future host is less than the aggregated risk score of the current host (328). If the aggregated residual risk score of the future host is less than the aggregated residual risk score of the current host, the host assessment system may automatically migrate assets from the current host to the future host (330).

FIG. 4 is an example operation 400 in accordance with the techniques described in this disclosure. The steps of operation 400 may be done by a computing device (e.g., computing system 200 of FIG. 2). In step 402, a host assessment system (e.g., host assessment system 208 of FIG. 2) may obtain a first plurality of risks of a current host and a second plurality of risks of a future host. The host assessment system may obtain the plurality of risks of the current host and future host with one or more software tools designed to analyze data of a host to abstract risks associated with the host.

In step 404, the host assessment system may determine a first set of residual risk scores for the first plurality of risks of the current host and a second set of residual risk scores for the second plurality of risks of the future host. The host assessment system may determine the first set of residual risk scores and the second set of residual risks score with groups as discussed previously.

In step 406, the host assessment system may aggregate the first set of residual risk scores associated with the current host and the second set of residual risk scores associated with the future host. In some examples, the host assessment system may determine the aggregated residual risk score of the first set of residual risk scores and the aggregated residual risk score of the second set of residual risk scores by taking the average of residual risk scores within the respective set of residual risk scores.

In step 408, the host assessment system may determine whether the second aggregate residual risk score associated with the future host is less than the first aggregate residual risk score associated with the current host.

In step 410, the host assessment system may migrate assets from the current host to the future host in response to determining the second aggregate residual risk score associated with the future host is less than the first aggregate residual risk score associated with the current host. In some examples, the host assessment system may prompt a user via a user interface before migrating assets from the current host to the future host. If the host assessment system determines that the second aggregate residual risk score associated with the future host is greater than the first aggregate residual risk score associated with the current host, the host assessment system may issue a warning to a user via a user interface indicating that it would not be safe to migrate assets from the current host to the future host. The host assessment system may also include the first set of residual risk scores associated with the current host and the second set of residual risk scores associated with the future host in the warning to inform the user on how to mitigate residual risk associated with a particular host.

Figure 5:
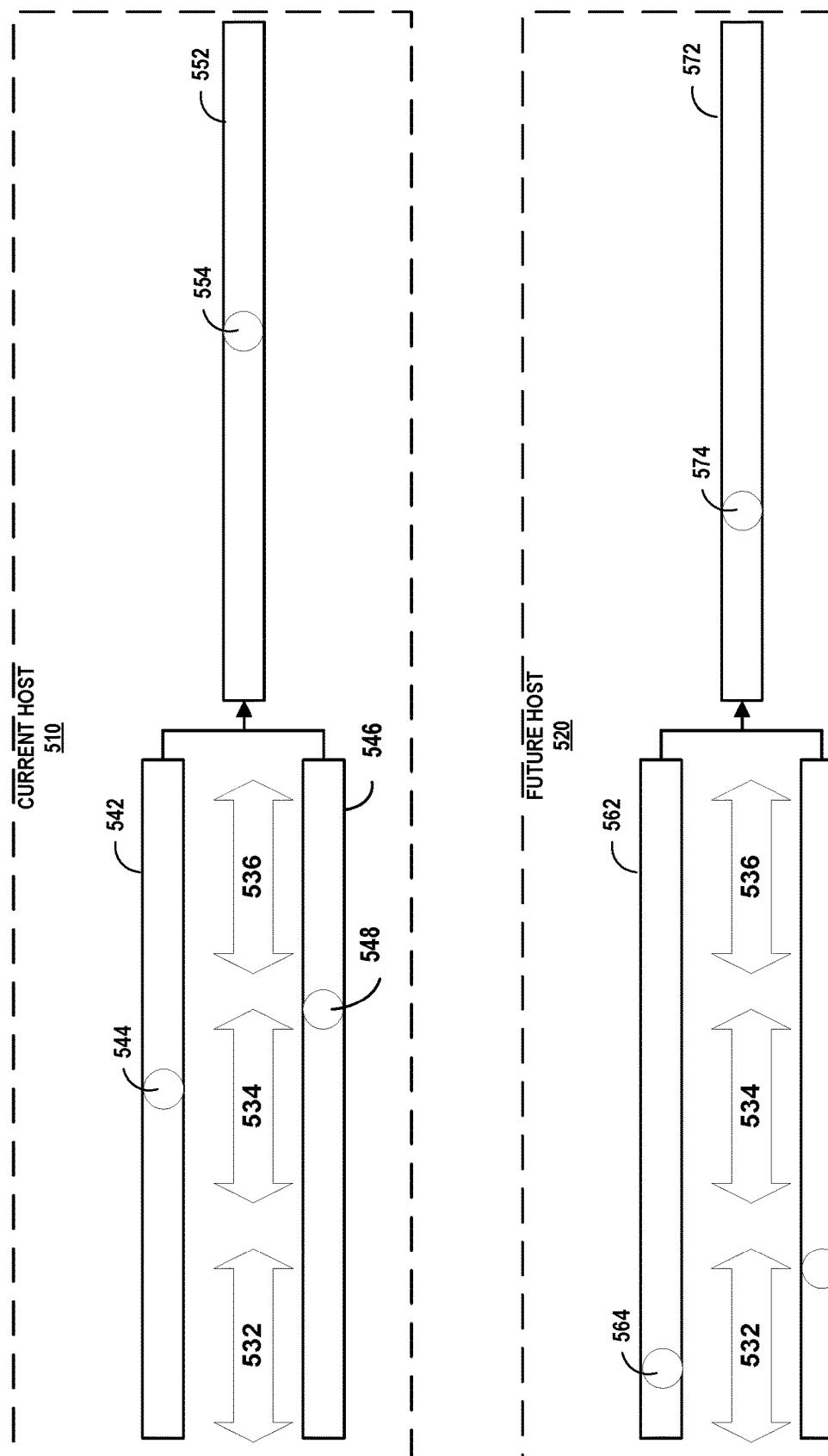
FIG. 5 is a block diagram illustrating an example operation of aggregating risk scores of a current host and a future host.

FIG. 5 is a block diagram illustrating an example operation of aggregating risk scores of a current host and a future host.

In accordance with techniques of this disclosure, a host assessment system (e.g., host assessment system 208 of FIG. 2) may aggregate quantitative and qualitative risk scores of a current host and future host to support a migration of assets to the future host. The host assessment system may aggregate quantitative residual risk score 544 of current host 510 and qualitative residual risk score 548 of current host 510 to generate an aggregated risk score 554 associated with current host 510. The host assessment system may aggregate quantitative residual risk score 564 of future host 520 and qualitative residual risk score 568 of future host 520 to generate an aggregated risk score 574 associated with future host 520.

The host assessment system may determine a quantitative residual risk score (e.g., quantitative residual risk score 544 or 564) based on a spectrum 542 or 562 and a qualitative residual risk score (e.g., qualitative residual risk score 548 or 568) based on spectrum 546 or 566. Spectrum 542, 562, 546, and 566 (hereinafter, "spectrum 542, 562, 546, 566") may represent all possible values of one or more quantitative risks and qualitative risks ordered based on a level of risk. In the example of FIG. 5, spectrum 542, 562, 546, 566 may be created based on one or more risk factors, where the risk factor values with the least level of risk is on the far most left of spectrum 542, 562, 546, 566, the risk factor values with the most level of risk is on the far most right of spectrum 542, 562, 546, 566, and all other risk factor values are plotted in between in ascending order. The host assessment system may determine the placement of quantitative residual risk score 544 and 564 on spectrum 542 and 562, respectively, and the placement of qualitative residual risk score 548 and 568 on spectrum 546 and 566, respectively, based on data obtained from a host by a data collection unit (e.g., data collection unit 212 of FIG. 2).

In some examples, the host assessment system may create groups 532, 534, and 536 to assign an integer value to residual risk scores 544, 548, 564, and 568. In the example of FIG. 5 each group 532, 534, and 536 may include one or more number values representing a potential residual risk scores and associated risk factor values. The one or more number values may be based on a level of risk of the associated risk factor values. For example, group 532 may include number values between 0 and 1.66 that correlate to a low level of quantitative and qualitative risk factor values that were plotted on spectrum 542, 562, 546, 566. Group 534 may include number values between 1.67 and 3.33 that correlate to a moderate level of quantitative and qualitative risk factor values that were plotted on spectrum 542, 562, 546, 566. Group 536 may include number values between 3.34 and 5 that correlate to a high level of quantitative and qualitative risk factor values that were plotted on spectrum 542, 562, 546, 566. Quantitative residual risk score 544 of current host 110 may, for example, be assigned a value of 2.64 based on quantitative risks of current host 110 and plotted on spectrum 542. Qualitative residual risk score 548 of current host 110 may, for example, be assigned a value of 2.88 based on qualitative risks of current host 110 and plotted on spectrum 546. Quantitative residual risk score 564 of future host 120 may, for example, be assigned a value of 0.83 based on quantitative risks of future host 120 and plotted on spectrum 562. Qualitative residual risk score 568 of future host 120 may, for example, be assigned a value of 1.67 based on qualitative risks of future host 120 and plotted on spectrum 566.

The host assessment system may determine aggregated residual risk score 554 for current host 510 and aggregated residual risk score 574 for future host 520 by taking the average of the quantitative residual risk score and the qualitative residual risk score of a given host. Following the example above, aggregated residual risk score 554 of current host 510 would be 2.76 (i.e., the average of 2.64 and 2.88) and aggregated residual risk score 574 of future host 520 may be 1.25 (i.e., the average of 0.83 and 1.67). In this example, the host assessment system may begin to migrate assets from current host 510 to future host 520 because aggregated residual risk score 574 of future host 520 is less than aggregated residual risk score 554 of current host 510.

Various examples have been described. These and other examples are within the scope of the following claims.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each depict at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the illustrations and/or may include additional devices and/or components not shown in the illustrations.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method, comprising:

obtaining, by one or more processors, data defining a first plurality of risks for a current host, wherein the data defining the first plurality of risks corresponds to one or more risk factors for each of two or more of an application domain, a hosting service domain, or a data center domain;

determining, by the one or more processors, a first set of residual risk scores for each risk of the first plurality of risks;

aggregating, by the one or more processors, the first set of residual risk scores associated with the current host to form a first aggregate residual risk score;

generating, by the one or more processors, a synthetic application that embodies characteristics of an application on the current host and deploying the synthetic application to a future host;

obtaining, by the one or more processors, data defining a second plurality of risks for the future host by monitoring performance of the future host with the synthetic application, wherein the data defining the second plurality of risks corresponds to one or more risk factors for each of two or more of an application domain, a hosting service domain, or a data center domain;

determining, by the one or more processors, a second set of residual risk scores for each risk of the second plurality of risks after it is determined that the future host has met control objectives of a control adherence framework;

aggregating, by the one or more processors, the second set of residual risk scores associated with the future host to form a second aggregate residual risk score;

determining, by the one or more processors, whether the second aggregate residual risk score is less than the first aggregate residual risk score; and in response to determining the second aggregate residual risk score is less than the first aggregate residual risk score, migrating, by the one or more processors, assets from the current host to the future host.

2. The method of claim 1, wherein the first plurality of risks and the second plurality of risks are associated with a domain of a plurality of domains, wherein the plurality of domains comprises the application domain, the hosting service domain, and the data center domain.

3. The method of claim 1, further comprising, in response to migrating, by the one or more processors, the assets from the current host to the future host, continuously determining, by the one or more processors, a residual risk score of the future host.

4. The method of claim 1, further comprising, in response to determining the second aggregate residual risk score is greater than the first aggregate residual risk score, sending, by the one or more processors, a warning via a user interface.

5. The method of claim 1, wherein obtaining the second plurality of risks of the future host further comprises:
sending, by the one or more processors, synthetic data to the future host;
monitoring the future host processing the synthetic data; and
determining, by the one or more processors, the second plurality of risks based on the monitoring.

6. The method of claim 1, wherein each risk of the first plurality of risks and the second plurality of risks are associated with a corresponding risk factor of a plurality of risk factors, and wherein determining the first and second sets of residual risk scores for each of the respective first and second plurality of risks further comprises:
establishing a plurality of groups associated with each respective risk factor, wherein each group of the plurality of groups comprises a risk score;
determining, by the one or more processors, a value of each risk of the first plurality of risks and the second plurality of risks;
assigning, by the one or more processors, each risk of the first plurality of risks and the second plurality of risks to a group of the plurality of groups associated with the corresponding risk factor based on the value of each risk; and
determining, by the one or more processors, the residual risk score for each risk of the first plurality of risks and the second plurality of risks based on the risk score of the assigned group.

7. The method of claim 6, wherein the plurality of risk factors further comprises:
one or more quantitative risk factors, wherein the one or more quantitative risk factors includes at least one of:
policy exceptions,
control applicability, and
open issues; and
one or more qualitative risk factors, wherein the one or more qualitative risk factors includes at least one of:
an organizational training score,
an organizational modernization score, and
a migration strategy score.

8. The method of claim 1, wherein obtaining, by the one or more processors, the data defining the first plurality of risks and the data defining the second plurality of risks further comprises:
executing, by the one or more processors, one or more software tools designed to collect records associated with the first plurality of risks and the second plurality of risks; and generating, by the one or more software tools, the data defining the first plurality of risks and the second plurality of risks based on the records.

9. The method of claim 1, further comprising:
in response to determining, by the one or more processors, whether the second aggregate residual risk score is less than the first aggregate residual risk score, displaying, by the one or more processors and with an interface, the first aggregate residual risk score, the second aggregate residual risk score, the data defining the first plurality of risks, and the data defining the second plurality of risks.

10. A computing device comprising:
a memory; and
one or more processors in communication with the memory and configured to:
obtain data defining a first plurality of risks for a current host, wherein the data defining the first plurality of risks corresponds to one or more risk factors for each of two or more of an application domain, a hosting service domain, or a data center domain;
determine a first set of residual risk scores for each risk of the first plurality of risks;
aggregate the first set of residual risk scores associated with the current host to form a first aggregate residual risk score;
generate a synthetic application that embodies characteristics of an application on the current host and deploy the synthetic application to a future host;
obtain data defining a second plurality of risks of the future host by monitoring performance of the future host with the synthetic application, wherein the data defining the second plurality of risks corresponds to one or more risk factors for each of two or more of an application domain, a hosting service domain, or a data center domain;
determine a second set of residual risk scores for each risk of the second plurality of risks after it is determined that the future host has met control objectives of a control adherence framework;
aggregate the second set of residual risk scores associated with the future host to form a second aggregate residual risk score;
determine whether the second aggregate residual risk score is less than the first aggregate residual risk score; and
migrate assets from the current host to the future host.

11. The computing device of claim 10, wherein the first plurality of risks and the second plurality of risks are associated with a domain of a plurality of domains, wherein the plurality of domains comprises the application domain, the hosting service domain, and the data center domain.

12. The computing device of claim 10, wherein the one or more processors are further configured to:
in response to migrating the assets from the current host to the future host, continuously determine a residual risk score of the future host.

13. The computing device of claim 10, wherein the one or more processors are further configured to:
in response to determining the second aggregate residual risk score is greater than the first aggregate residual risk score, send a warning via a user interface.

14. The computing device of claim 10, wherein the one or more processors are further configured to:
send synthetic data to the future host;
monitor the future host processing the synthetic data; and determine the second plurality of risks based on the monitoring.

15. The computing device of claim 10, wherein each risk of the first plurality of risks and the second plurality of risks are associated with a corresponding risk factor of a plurality of risk factors, and wherein the one or more processors are further configured to:

establish a plurality of groups associated with each respective risk factor, wherein each group of the plurality of groups comprises a risk score;

determine a value of each risk of the first plurality of risks and the second plurality of risks;

assign each risk of the first plurality of risks and the second plurality of risks to a group of the plurality of groups associated with the corresponding risk factor based on the value of each risk; and determine the residual risk score for each risk of the first plurality of risks and the second plurality of risks based on the risk score of the assigned group.

16. The computing device of claim 10, wherein the one or more processors are further configured to:

execute one or more software tools designed to collect records associated with the first plurality of risks and the second plurality of risks; and generate, by the one or more software tools, the data defining the first plurality of risks and the second plurality of risks based on the records.

17. The computing device of claim 10, wherein the one or more processors are further configured to:

in response to determining whether the second aggregate residual risk score is less than the first aggregate residual risk score, display, with an interface, the first aggregate residual risk score, the second aggregate residual risk score, the data defining the first plurality of risks, and the data defining the second plurality of risks.

18. A non-transitory computer-readable storage medium storing instructions that, when executed, cause one or more processors of a server device to:

obtain data defining a first plurality of risks for a current host, wherein the data defining the first plurality of risks corresponds to one or more risk factors for each of two or more of an application domain, a hosting service domain, or a data center domain;

determine, a first set of residual risk scores for each risk of the first plurality of risks;

aggregate the first set of residual risk scores associated with the current host to form a first aggregate residual risk score;

generate a synthetic application that embodies characteristics of an application on the current host and deploy the synthetic application to a future host;

obtain data defining a second plurality of risks of the future host by monitoring performance of the future host with the synthetic application, wherein the data defining the second plurality of risks corresponds to one or more risk factors for each of two or more of an application domain, a hosting service domain, or a data center domain;

determine a second set of residual risk scores for each risk of the second plurality of risks after it is determined that the future host has met control objectives of a control adherence framework;

aggregate the second set of residual risk scores associated with the future host to form a second aggregate residual risk score;

determine whether the second aggregate residual risk score is less than the first aggregate residual risk score; and migrate assets from the current host to the future host.

19. The method of claim 1, wherein the one or more risk factors comprise capability and security for the hosting service domain.

20. The method of claim 1, wherein the one or more risk factors comprise resiliency, capability, and security for the data center domain.

* * * * *